United States Patent [19]
Ernst et al.

[11] Patent Number: 5,825,955
[45] Date of Patent: Oct. 20, 1998

[54] FIBER OPTIC DIVERSION CONNECTOR

[75] Inventors: Scot A. Ernst, Downers Grove; Igor Grois, Northbrook; Aleksandr Kats, Skokie; Ilya Makhlin, Wheeling; Michael J. Pescetto, Plainfield, all of Ill.

[73] Assignee: Molex Incorporated, Lisle, Ill.

[21] Appl. No.: 795,578

[22] Filed: Feb. 5, 1997

[51] Int. Cl.⁶ ........................................ G02B 6/38
[52] U.S. Cl. ................... 385/79; 385/38; 385/61
[58] Field of Search ..................... 385/61, 79, 78, 385/60, 62, 66, 67, 68, 80, 81, 84, 85, 140, 139

[56] References Cited

U.S. PATENT DOCUMENTS

| | | | |
|---|---|---|---|
| 4,436,366 | 3/1984 | Abramson | 350/96.2 |
| 4,998,795 | 3/1991 | Bowen et al. | 385/78 |
| 5,058,983 | 10/1991 | Corke et al. | 385/78 |
| 5,134,674 | 7/1992 | Huber | 385/61 |
| 5,463,709 | 10/1995 | Terao et al. | 385/85 |

*Primary Examiner*—John Ngo
*Attorney, Agent, or Firm*—A. A. Tirva

[57] ABSTRACT

A diversion connector is disclosed for mating with an optical fiber of an associated fiber optic transmission means. The connector includes a body having an end face for mating with the associated fiber optic transmission means, the end face traversing the optic axis. A fiber section is mounted in the body and includes a front fiber end and a rear fiber end. The front fiber end is adapted for mating with an end of the optical fiber of the associated fiber optic transmission means. The rear fiber end is at an angle to the optic axis to prevent light energy transmitted by the optical fiber from being reflected back toward the fiber and to protect an operator's eyes from the transmitted light energy.

7 Claims, 3 Drawing Sheets

FIBER OPTIC DIVERSION CONNECTOR

FIELD OF THE INVENTION

This invention generally relates to the art of fiber optic connectors and, particularly, to a diversion connector to prevent light energy transmitted by an optical fiber from being reflected back toward the fiber as well as to protect and operator's eyes from the transmitted light energy.

BACKGROUND OF THE INVENTION

Fiber optic connectors of a wide variety of designs have been employed to terminate optical fiber cables and to facilitate connection of the cables to other cables or other optical fiber transmission devices. A typical optical fiber connector includes a ferrule which mounts and centers the optical fiber within the connector. The ferrule is mounted in some form of ferrule holder which is assembled within another body member of the connector. The ferrule may be fabricated of such material as ceramic, and the ferrule holder typically is molded from plastic material. When the ferrule holder is assembled within the body member of the connector, it is biased by a spring such that the ferrule yieldably projects from the connector for engaging another fiber-mounting ferrule of a mating connecting device. A pair of connectors often are mated in an adapter which centers the fibers to provide low insertion losses. The adapter couples the connectors together so that their encapsulated fibers connect end-to-end.

Various problems are encountered when terminating optical fibers in fiber optic connectors versus terminating electrical conductors in electrical connectors, when situations arise wherein a fiber end of an "active" fiber optic connector is exposed. A typical situation might arise when one of the fiber optic connectors at one end of an adapter is removed, leaving the other "active" fiber optic connector in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed end of an active optical fiber. Still another problem concerns damage which may result from light energy being reflected back toward a fiber as sort of a "feed-back". In other words, if a fiber optic connector is "active" or is transmitting light energy in an unconnected condition, there may be sufficient reflection of the light energy that the reflected light may damage a light transmission device, such as a laser.

Heretofore, dust covers or end caps have been used to cover exposed fiber ends to protect the fiber ends from adverse environmental hazards. However, such dust covers or end caps actually can cause light energy to be reflected back toward the fiber. When using an adapter, it has been proposed to include a spring-loaded shutter on the adapter which, upon removal of one of the connectors from the adapter, covers the opening to the adapter and blocks the exposed fiber end of the remaining connector. In fact, the backside of the shutter may include an oblique surface for the light beam to impinge upon and be deflected. Although such shutters have proven quite effective, in certain circumstances there still may be some light reflection back to the light transmitting device for example, because of light diffusion.

The present invention is directed to solving these problems by providing a diversion connector for mating with an optical fiber of an associated fiber optic transmission means or connector to prevent light energy transmitted by the optical fiber from being reflected back toward the fiber and to protect an operator's eyes from the transmitted light energy.

SUMMARY OF THE INVENTION

An object, therefore, of the invention is to provide a fiber optic diversion connector for diverting light energy from an optical fiber of an associated fiber optic transmission means.

In the exemplary embodiment of the invention, the diversion connector includes a body having an end face for mating with the associated fiber optic transmission means. The end face traverses the optic axis of the optical fiber. A fiber section is mounted in the body and includes a front fiber end and a rear fiber end. The front fiber end is adapted for mating with an end of the optical fiber of the associated fiber optic transmission means. The rear fiber end is at an angle to the optic axis to prevent light energy transmitted by the optical fiber from being reflected back toward the fiber. The diversion connector also protects an operator's eyes from the transmitted light energy.

As disclosed herein, the fiber section is mounted in a ferrule having a distal end projecting from the body. The distal end encompasses the front fiber end of the fiber section. The angle of the rear fiber end may be on the order of 8°.

Another feature of the invention is the provision of seal means for hermetically sealing the rear fiber end of the fiber section. As disclosed herein, the seal means comprises a material, such as a transparent epoxy, substantially covering the angled rear fiber end of the fiber section. Preferably, the epoxy has a refractive index which matches the refractive index of the fiber section and forms a lens with a substantially spherical shape having a focal point located near the angled end of the fiber.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
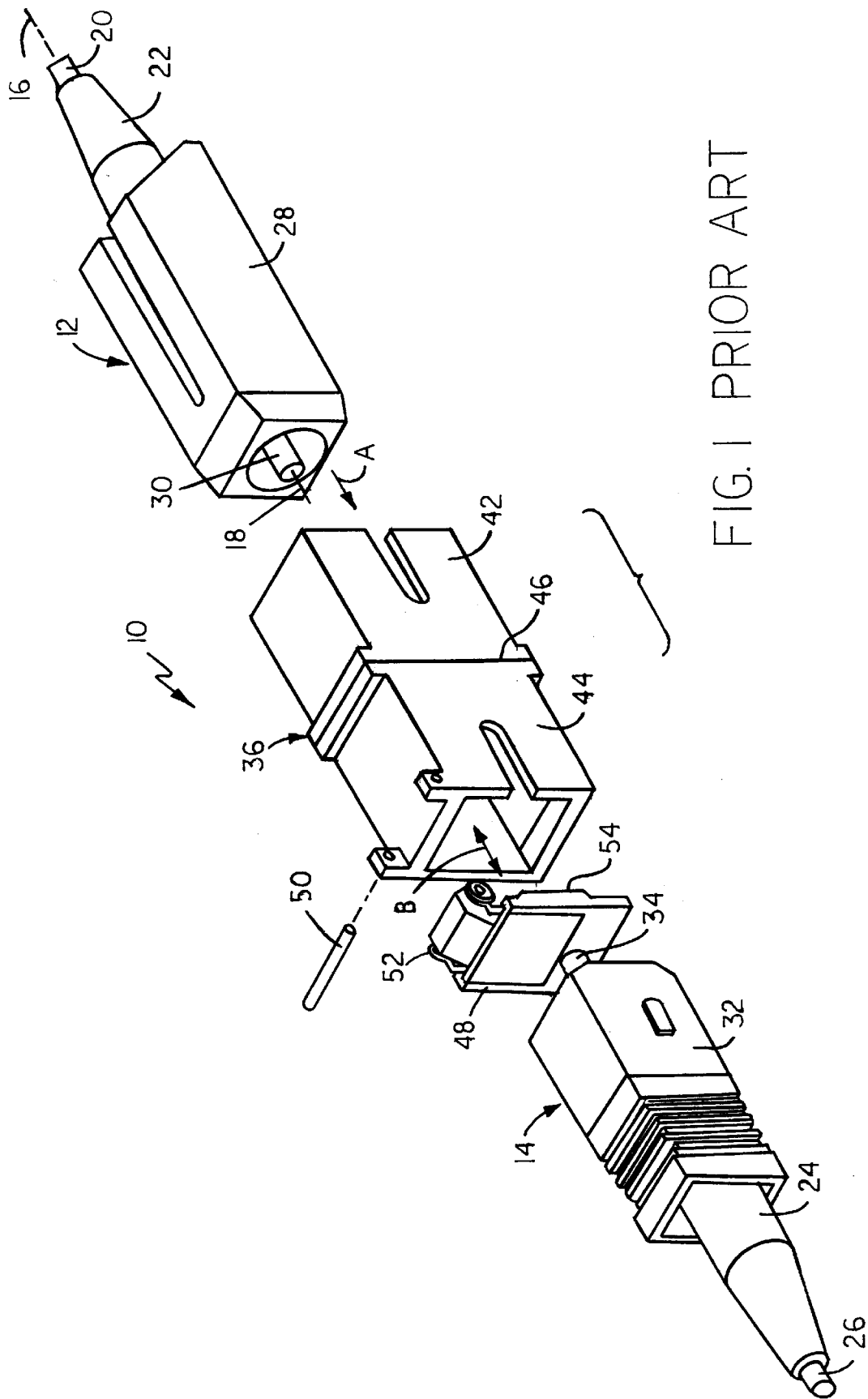
FIG. 1 is an exploded perspective view of a fiber optic adapter assembly according to the prior art.

Referring to the drawings in greater detail, and first to FIG. 1, a fiber optic adapter assembly, generally designated 10, is shown in accordance with a system of the prior art.

The system includes a first connector, generally designated 12, and a second connector, generally designated 14. Connector 12 may be considered, generally, a fiber optic transmission means for mounting an optical fiber on an optic axis 16. Specifically, connector 12 mates an end of an optical fiber 18 of a fiber optic cable 20 to an optical fiber of second connector 14. Connector 12 may include a strain relief boot 22. Connector 14, including a strain relief boot 24, terminates a second fiber optic cable 26. Connector 12 includes a housing 28 mounting a forwardly protruding ferrule 30, and connector 14 includes a housing 32 mounting a forwardly protruding ferrule 34. Connectors 12 and 14 are coupled end-to-end in an adapter, generally designated 36, which may be mounted on a back plane or other panel of an electronic apparatus (not shown) to thereby connect the ends of the optical fibers of cables 20 and 26 at an end-to-end interconnection.

Adapter 36 is shown to include a pair of adapter halves 42 and 44 secured together at an interface 46, as by adhesives or ultrasonic welding. Adapter half 42 forms a receptacle for connector 12, and adapter half 44 forms a receptacle for connector 14. When the adapter is mounted in an aperture of a back plane or other panel and held within the panel aperture, connector 12 can be inserted into adapter half 42 in the direction of arrow "A". Connector 14 can be inserted into and removed from adapter half 44 in the direction of double-headed arrow "B".

As is known in the art, situations arise wherein one of the connectors, such as connector 14, must be removed from adapter 36, leaving connector 12 in the adapter. If connector 12 remains "active" (i.e. light energy still is transmitted through fiber 18 of fiber optic cable 20) notwithstanding the removal of connector 14, problems can arise as outlined in the "Background", above. According to the system of the prior art shown in FIG. 1, in order to obviate such problems, a movable protective shutter or shield 48 is hinged to adapter half 44 on a pivot shaft or rod 50. The shield is spring loaded by a coil spring 52 to bias the protective shield to a closed position closing the open end of adapter half 44. Therefore, when connector 14 is removed from the adapter, protective shield 48 automatically closes and acts as a dust cover or cap to protect the exposed end of fiber 18 of connector 12. The protective shield also protects an operator's eyes from dangerous light transmitted by fiber 18. Still further, the inner surface 54 of the protective shield may be at an angle to axis 16 to deflect the light energy and prevent "feed-back" of the light beams to fiber 18.

Figure 2:
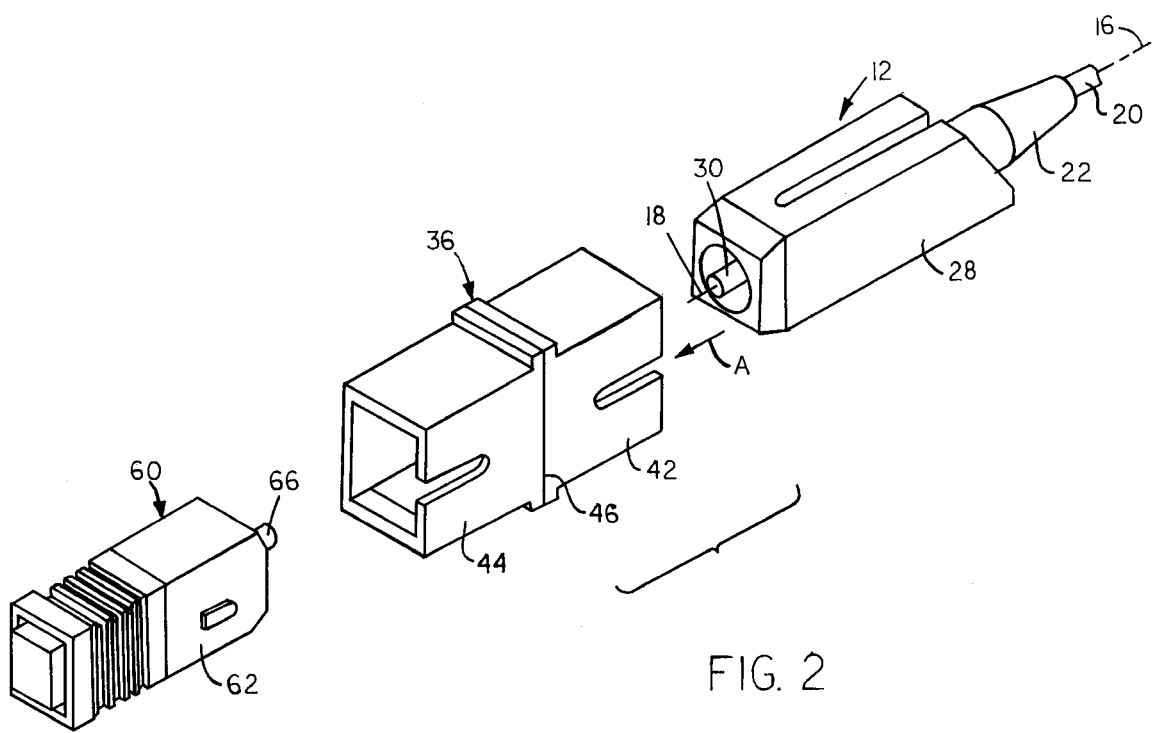
FIG. 2 is an exploded perspective view of a fiber optic adapter assembly embodying the diversion connector of the invention.
Figure 3:
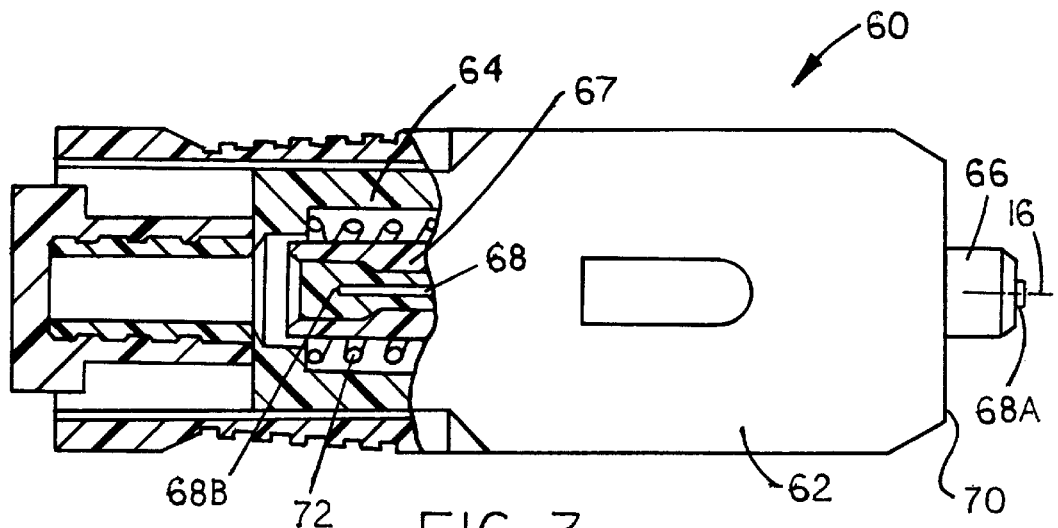
FIG. 3 is a fragmented elevational view of the diversion connector.

FIGS. 2–3 show an improved protective system which includes a fiber optic diversion connector, generally designated 60, for mating with an optical fiber of an associated fiber optic transmission means, such as optical fiber 18 of first connector 12. For illustration purposes, diversion connector 60 is shown in conjunction with adapter 36 and first connector 12. Consequently, like numerals have been applied in FIG. 2 corresponding to like components described above in relation to the prior art system of FIG. 1. However, it should be understood that the invention embodied in diversion connector 60 is not limited to use with an adapter system or even with a connector such as connector 12. The diversion connector can be mated with a variety of fiber optic transmission means.

With that understanding, diversion connector 60 includes a housing 62 mounting an interior body 64 which, in turn, mounts a ferrule 66 within a ferrule holder 67. The ferrule mounts a fiber section 68 on optic axis 16. Generally, the housing 62/body 64 defines an end face 70 for mating with an associated fiber optic transmission means, such as connector 12. A coil spring 72 surrounds ferrule holder 67 and, as is known in the art, the spring biases the ferrule holder forwardly whereby the ferrule yieldably projects from the connector for engaging another fiber-mounting ferrule of the mating fiber optic transmission means, such as ferrule 30 of connector 12.

Figure 4:
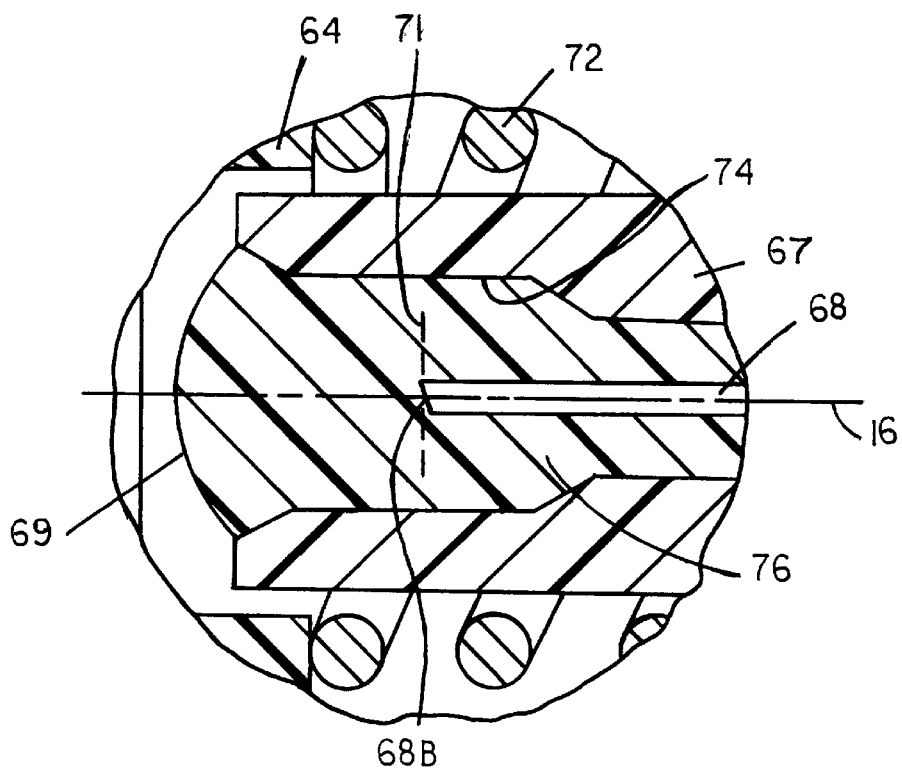
FIG. 4 is an enlarged, fragmented view of the area of the encapsulated rear fiber end of the fiber section of the diversion connector.

Fiber section 68 includes a front fiber end 68a (FIG. 3) and a rear fiber end 68b. Front fiber end 68a is adapted for mating with an end of the optical fiber of the associated fiber optic transmission means, such as fiber 18 of connector 12. The rear fiber end 68b is at an angle to optic axis 16 as seen most clearly in FIG. 4. The angle may be on the order of 8° relative to the axis. Therefore, when light is transmitted through the fiber of a mated fiber optic transmission means, such as fiber 18 of connector 12, the light enters fiber section 68 of diversion connector 60 and is deflected away from optic axis 16 by angled rear end 68b of the fiber section. This effectively eliminates light energy from being reflected back toward fiber 18 and prevents any "feed-back" through the fiber optic cable of an "active" fiber optic transmission means which is mated with diversion connector 60. The diversion connector also protects an operator's eyes from dangerous light beams from the mated fiber optic transmission means.

The invention also contemplates the provision of a seal means for hermetically sealing the rear fiber end 68b of fiber section 68. As disclosed herein, the rear end of ferrule holder 67 is provided with an enlarged passage or cavity 74 for receiving a protective material 76 which completely surrounds the rear angled end 68b of fiber section 68. In other words, whereas the front end of ferrule 66 tightly mounts the fiber section to center the section on optic axis 16, as is known in the art, the rear end of the fiber extends into cavity 74 which receives sealing material 76. The sealing material may take the form of a transparent epoxy, an index-matching gel or the like. In the preferred embodiment, the sealing material may comprise a transparent epoxy. Whatever the material, the epoxy preferably has a refractive index which matches the refractive index of the core of the fiber section 68 at the angled rear end thereof.

The epoxy material filling the cavity 74 forms a substantially spherical lens 69 at the end face of the ferrule holder. The lens has a focal point which is located near the angled rear end of the fiber 68. It has been determined experimentally by movement of the fiber within the ferrule prior to the hardening of the epoxy, that light reflection is at a minimum when the rear end of angled fiber is located in the focal plane 71 of the lens formed by the epoxy.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A diversion connector for mating with an optical fiber of an associated fiber optic transmission means, the fiber extending along an optic axis, comprising:

a body having an end face for mating with the associated fiber optic transmission means, the end face of the body traversing said optic axis;

a fiber section mounted in the body and including a front fiber end and a rear fiber end, the front fiber end being adapted for mating with an end of the optical fiber of the associated fiber optic transmission means, and the rear fiber end being at an angle to the optic axis to prevent light energy transmitted by said optical fiber from being reflected back toward the fiber and to protect an operator's eyes from the transmitted light energy; and seal means for hermetically sealing the rear fiber end of said fiber section, wherein said seal means forms a substantially spherical lens.

2. The diversion connector of claim 1 wherein said seal means comprises a transparent epoxy covering the rear fiber end.

3. The diversion connector of claim 3 wherein said epoxy has a refractive index which matches the refractive index of the core of the fiber section.

4. The diversion connector of claim 1 wherein said rear end of the fiber is positional substantially in the focal plane of the lens.

5. The diversion connector of claim 1 wherein said fiber section is mounted in a ferrule having a distal end projecting from the body, the distal end encompassing the front fiber end of the fiber section.

6. The diversion connector of claim 1 wherein said angle is on the order of eight degrees.

7. The diversion connector of claim 1 wherein said angle is on the order of eight to fifteen degrees.

* * * * *